US012215015B2

(12) United States Patent
Bernard

(10) Patent No.: US 12,215,015 B2
(45) Date of Patent: Feb. 4, 2025

(54) EQUESTRIAN HEADPIECE

(71) Applicant: Chloe Bernard, Marlow (GB)

(72) Inventor: Chloe Bernard, Marlow (GB)

( * ) Notice: Subject to any disclaimer, the term of this patent is extended or adjusted under 35 U.S.C. 154(b) by 0 days.

(21) Appl. No.: 15/622,891

(22) Filed: Jun. 14, 2017

(65) Prior Publication Data

US 2018/0002155 A1 Jan. 4, 2018

(30) Foreign Application Priority Data

Jul. 1, 2016 (GB) ...................................... 1611539

(51) Int. Cl.
*B68B 1/02* (2006.01)
*B68B 1/04* (2006.01)

(52) U.S. Cl.
CPC ...................................... *B68B 1/04* (2013.01)

(58) Field of Classification Search
CPC ....... B68B 1/02; B68B 1/04; B68B 2001/042; B68B 7/00
USPC .................................. 54/6.1, 6.2, 13, 24, 85
See application file for complete search history.

(56) References Cited

U.S. PATENT DOCUMENTS 1,405,387 A * 2/1922 Barkdoll .................. B68B 1/04 54/6.1
1,619,224 A * 3/1927 Walsh ...................... B68B 5/00 54/6.1
1,639,066 A 8/1927 Walsh
2,526,140 A * 10/1950 Keyston ................... B68B 5/00 54/24
D163,375 S 5/1951 Elsinger
4,324,089 A * 4/1982 Hart .......................... B68B 1/02 54/24
4,480,427 A * 11/1984 Conrad ..................... B68B 1/04 54/24
6,305,152 B1 * 10/2001 Myler ....................... B68B 1/04 54/7

(Continued)

FOREIGN PATENT DOCUMENTS

DE 202005004344 U1 * 6/2005 ............... B68B 1/04
DE 202011103575 U1 * 10/2011 ............... B68B 1/04

(Continued)

OTHER PUBLICATIONS

Search Report issued for corresponding GB patent application No. 1611539.6, dated Dec. 5, 2016.

(Continued)

*Primary Examiner* — Peter M Poon
*Assistant Examiner* — Danielle A Clerkley
(74) *Attorney, Agent, or Firm* — WESTMAN CHAMPLIN & KOEHLER, P.A.; Amanda M. Prose

(57) ABSTRACT

A headpiece for a bridlery item for use with a horse or other equine animal is disclosed, which provides for improved communication between a horse and a rider, and/or improved comfort for the horse. Such a headpiece is connectable to a browband and has a first side piece and a second side piece wherein the first and second side pieces are connected by an articulated linkage above a connection between the headpiece and said browband. Articulation provides a degree of freedom of movement so that the first side piece and second side piece may move relative to one another and in doing so reduce the amount of tension transmitted between them and thus between reins, in use.

12 Claims, 5 Drawing Sheets

(56) References Cited

U.S. PATENT DOCUMENTS

| | | | | |
|---|---|---|---|---|
| 6,691,497 | B1 * | 2/2004 | Rodgers | B68B 1/02 54/24 |
| D503,501 | S | 3/2005 | Linton et al. | |
| D515,249 | S | 2/2006 | Mailer | |
| D640,425 | S | 6/2011 | Reed | |
| D642,747 | S | 8/2011 | Marschke et al. | |
| D645,213 | S | 9/2011 | Silverman | |
| D809,718 | S | 2/2018 | Martin, Jr. | |
| D827,214 | S | 8/2018 | Cress | |
| 10,301,169 | B1 * | 5/2019 | Bjarle | B68B 1/06 |
| D858,903 | S | 9/2019 | Jennings et al. | |
| D862,803 | S | 10/2019 | Yun | |
| 2002/0007619 | A1 * | 1/2002 | Myler | B68B 1/04 54/7 |
| 2006/0156698 | A1 | 7/2006 | Barnes | |
| 2007/0033908 | A1 * | 2/2007 | Menet | B68B 1/04 54/13 |
| 2007/0089380 | A1 * | 4/2007 | Bechtold | B68B 1/02 54/24 |
| 2013/0008934 | A1 | 1/2013 | Liu et al. | |
| 2013/0040279 | A1 * | 2/2013 | Lane | G09B 19/24 434/392 |
| 2013/0160409 | A1 * | 6/2013 | Crothers | B68B 1/02 54/24 |

FOREIGN PATENT DOCUMENTS

| | | | | | |
|---|---|---|---|---|---|
| DE | 102011101030 | A1 | | 11/2012 | |
| EP | 3141518 | A1 | | 3/2017 | |
| ES | 1114185 | | | 6/2014 | |
| FR | 2920420 | A1 | * | 3/2009 | B68B 1/02 |
| GB | 2349219 | A | | 10/2000 | |
| GB | 2517150 | A | * | 2/2015 | B68B 1/04 |
| WO | WO-9937579 | A1 | * | 7/1999 | B68B 1/04 |

OTHER PUBLICATIONS

Pet Safe Martingale Dog Collar, reviewed on Chewy.com on Sep. 2013, viewed online on Aug. 20, 2020, Available at URL: https://www.chewy.com/petsafe-premier-nylon-martingale-dog/dp/55668.

Search Report issued for EP Patent Application Serial No. 17178050.5 dated Dec. 6, 2017.

* cited by examiner

EQUESTRIAN HEADPIECE

FIELD OF THE INVENTION

The present invention relates to an equestrian headpiece, such as is employed in bridlery items such as head collars, halters, bridles or lunging cavessons for example, for a horse or other equine animal, as well as to a bridlery item including such a headpiece.

In the following description, the invention will be described with reference to a bridle. As noted above, it is equally applicable to other forms of equestrian headpieces for use as part of bridlery items such as head collars, halters, and lunging cavessons, which shall be considered as included within the term "bridle".

BACKGROUND ART

Communication between a horse (or other equine animal such as a donkey) and a rider can be established by the use of a bridle, and (where incorporated) a bit which is generally placed in the horse's mouth, in use. FIG. 1 shows a conventional arrangement in which the horse (of which only the head 10 is shown) has a bit 12 located in its mouth 32 between its teeth (with just the end of the bit being visible, therefore). Force or pressure can be applied to the bit 12 by the rider by manipulating one or more reins (not shown), which are connected to the bit 12 via bit rings 14 and extend rearwardly to be held by a rider seated on the horse's back. Typically, there is a bit ring 14 at either end of the bit 12 and the reins are joined to the bit rings 14. Traditionally, the bit 12 is held in place and prevented from falling out of the horse's mouth by a bridle 16, which generally comprises a headpiece 18, a noseband 20*a*, 20*b*, a browband 22, cheekpieces 24 and a throatlash 26. The cheekpieces 24 extend generally upwards from the bit rings 14 on either side of the horse's head 10 alongside its cheeks 28, and are connected to or integral with the headpiece 18 that extends over the top of the horse's head 10 behind its ears 30. Thus, the bit 12 cannot fall downwards and out of the horse's mouth 32 while the cheekpieces 24 and headpiece 18 are in place. To keep them in the correct position, the browband 22 extends forward across the horse's brow from the junction 34 between the headpiece 18 and the cheekpieces 24, between the eyes 36 and ears 30. This prevents the bridle 16 from slipping backwards. Likewise, the throatlash 26 extends downwardly and rearwardly from the junction 34 between the headpiece 18 and the cheekpieces 24, and passes under the horse's throat, preventing forward movement of the upper part of the bridle.

Further stabilisation is usually provided by the noseband 20*a*, 20*b*, which passes around the horse's head 10 below the eyes 36 and in the vicinity of the bit rings 14; one or more nosebands 20*a* and 20*b* may be provided and are linked back to the junction 34 between the headpiece 18 and the cheekpieces 24 by noseband attachment straps 38, in this case one on either side that run substantially alongside the cheekpieces 24. Having separate cheekpieces 24 and noseband attachment straps 38 allows the bit rings 14 and cheekpieces 24 to move forward and back relative to the horse's head 10 in response to changes of forces exerted on the reins by way of manipulation by the rider.

Many different arrangements of bridlery items have been used or suggested, which are configured differently, but to which similar principles apply and thus may have the principles of the present invention applied to them. For example, a bitless bridle provides communication from the rider to the horse by way of changes of forces exerted by the reins (by manipulation by the rider) on the noseband. The same principles apply to such an arrangement as to the examples described herein.

Bridle design is usually concerned with two key factors: clarity of communication between the rider and the horse; and comfort of the horse. Known bridle arrangements can suffer from distorted communication because tension can be transmitted through the bridle from a rein on one side of the bit to the other side of the bit via the headpiece. Uncomfortable bridles may also reduce the ability of the horse to work effectively and reduce the clarity of communication between rider and horse. Significant efforts have been invested in designing padding and shaping of headpieces so as to fit the headpiece to commonplace horse characteristics, with the aim of directing pressure away from the most sensitive areas of the horse's head. This is of course made more complex by the fact that different horses have different sizes and shapes of head.

However, there is sometimes a tension between the provision of a bridle which is comfortable for the horse and one which provides clear communication from the rider to the horse. For example, with the aim of reducing pressure which can occur on the poll of a horse's head, i.e. just below the headpiece, padding is sometimes added to a part of the headpiece which rests on the horse's head. This may then add rigidity to the headpiece and thus aid, if not increase, transmission of tension across and through the bridle.

In recent years there has also been a trend in this field towards using non-traditional synthetic materials and/or differently-produced traditional materials in bridles. This is in response to a decline in the availability of traditionally-produced leathers in favour of leathers that, for the same strength, need to be thicker and are therefore more stiff. There are also accessory products available for attachment to existing headpieces. Use of such materials or accessories may have various advantages, but generally the properties of the materials used do not match those of traditional high-quality leathers used in the past. For example, neoprene-padded headpieces and headpiece accessories have been associated with additional thickness and stiffness compared with traditional leather headpieces. These factors can result in a headpiece transmitting more tension through the bridle than may be desirable, and the headpiece may also tip forward and back when the horse is working. Both these factors can cause discomfort to the horse especially if, during any tipping, the headpiece encroaches on the horse's ears or other sensitive area.

SUMMARY OF THE INVENTION

The present invention aims to provide a headpiece for a bridle which provides for improved communication between a horse and a rider, and/or improved comfort for the horse.

Accordingly, the present invention is directed to a headpiece for a bridle (or the like), the headpiece connectable to a browband, the headpiece having a first side piece and a second side piece wherein the first and second side pieces are connected by an articulated linkage and wherein the articulated linkage is above a connection between the headpiece and said browband, in use.

The articulated linkage may comprise a first joint between the first side piece and a central piece and a second joint between the second side piece and the central piece.

Articulation provides a degree of freedom of movement so that the first side piece and second side piece may move relative to one another and any central piece and in doing so reduce the amount of tension transmitted between them and thus between reins, in use.

The first and second side pieces may connect with the rest of a bridle, for example cheekpieces, throatlashes, a browband, etc., by any suitable means. One or both of the side pieces may be formed integrally with another element of a bridle such as the cheekpiece, for example.

This arrangement reduces the movement of the part of the headpiece which rests at the poll of the horse's head, when one or more reins are tensioned by the rider. Thus, in addition to improving communication between rider and horse, the horse's comfort is also improved. The size and shape of horses' heads vary; it is known to provide a variety of shapes and sizes of headpiece to cater for commonplace shapes and sizes. However, known headpieces are unlikely to be a precise match for an individual horse due to variation within commonplace groupings of shape and size. The present invention addresses this by allowing greater freedom for the headpiece to settle into the best possible position on a particular horse's head, even when the horse is moving.

One or more of the joints may comprise a ring, although other forms of join or transition that allow the necessary articulation are also possible. One alternative to a joint envisaged herein may comprise a piece of elastic material, linking two pieces and joined thereto by, for example, stitching.

Rings may provide for a degree of articulation in several dimensions. This allows a degree of freedom of movement of the side pieces relative to one another while enabling the central piece to remain substantially in its desired position.

This arrangement aids both improved communication and improved comfort. As an example, a backward pull on one rein will not be transmitted to the same extent to the central piece or to the side piece on the opposite side from the rein being pulled, under this arrangement compared with previous arrangements.

The rings may be connected to the side pieces and/or the central piece by way of a loop, or by loops formed in said pieces, or by a stitched fold in a part of the side piece or central piece, or by other suitable means.

One or more of the rings may be a D-ring. The D-rings may be arranged so that the substantially straight portion of the "D" is joined to a side piece and the substantially curved portion is joined to the central piece.

The use of D-rings arranged in this way encourages the central piece to remain stationary when one or more side pieces are moved.

At least a portion of the central piece may be formed of a flexible resilient material. Flexibility is important for the absorption of at least some tension which may be imparted to the central piece by one or more of the side pieces. Resilience is important for the return of the central piece to an original state after any deformation which may arise as a result of tension which may be imparted to the central piece by one of more of the side pieces.

Preferred materials for the central piece include leather such as but not limited to cow's leather or deer-skin, knitted or woven materials or a suitable synthetic material. The piece may be solid or may be an outer layer enveloping a padding material, for example.

A further aspect of the present invention arises as bridles may be modular, in that they are provided in discrete parts for assembly by a user before being placed on a horse. Bridles may also be provided as an integrated product including a headpiece as described above. Alternatively, some parts may be provided as an integrated product and others as discrete parts, the sum being suitable for assembly by a user.

The present invention thus also relates to a bridlery item comprising a headpiece having a first side piece and a second side piece wherein the first and second side pieces are connected by an articulated linkage. The bridlery item may comprise any of the other features of the headpiece as described herein.

The bridlery item may be provided as a sequence of: a first side piece, an articulated join, a central piece, a further articulated join, and a second side piece, the bridlery item adapted for connection to a browband below the articulated joins, in use.

The bridlery item may have one or more further elements joined to the sequence including a throatlash and a noseband.

The headpiece, bridlery item or sequence may be provided as a kit of parts.

The present invention is applicable to many designs of bridle, for example the traditional bridle as well as a double bridle such as may have further strap and cheekpieces linking to a second or "Weymouth" bit operated by a second pair of reins. Within the scope of suitable bridles there are many types of noseband, browband, cheekpiece and throatlash which are suitable for use with the present invention. The present invention can also apply to head collars, halters, bitless bridles and lunging cavessons and other forms of bridlery item.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
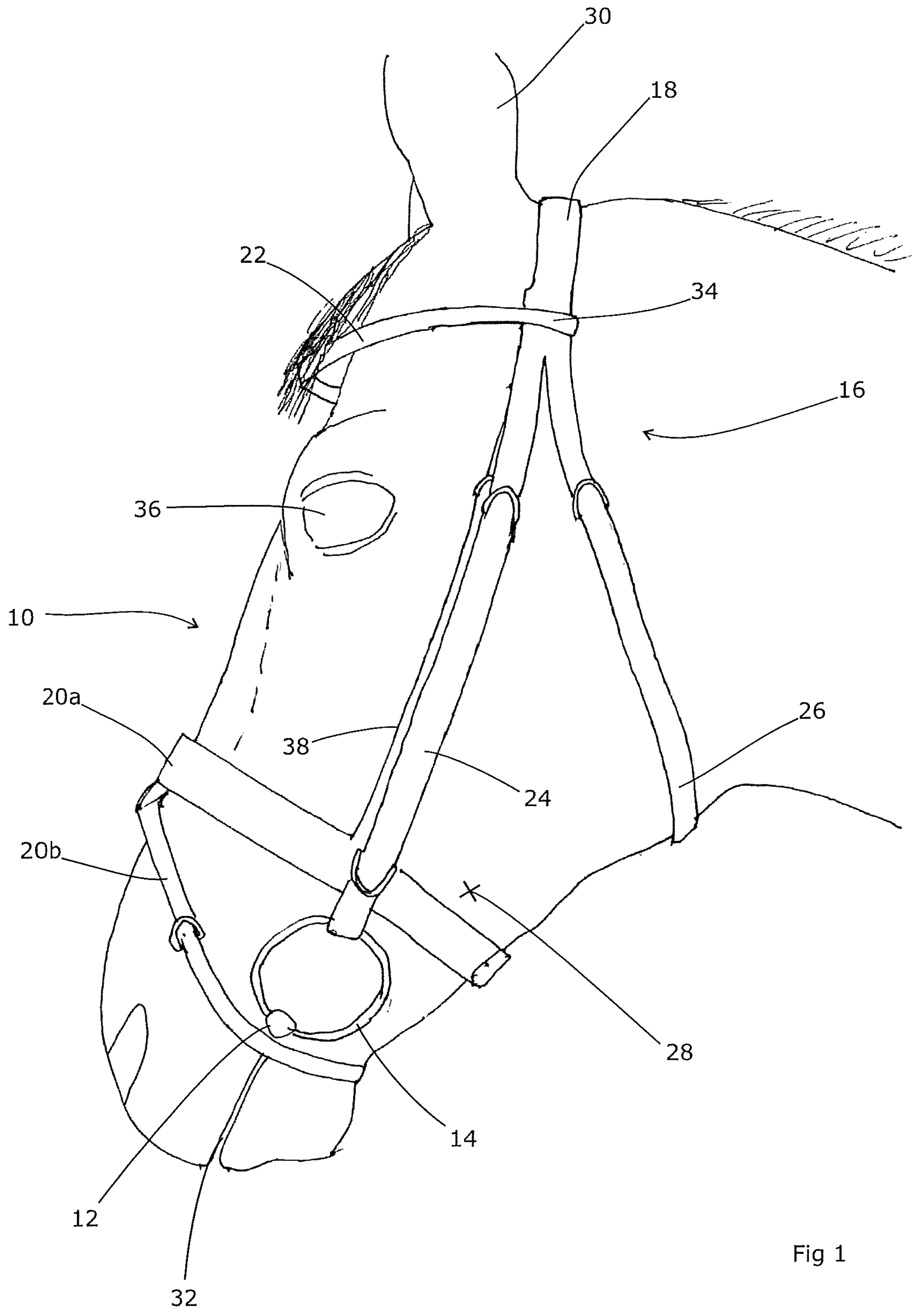
FIG. 1 shows a conventional arrangement of a bridle including a headpiece.

FIG. 1 shows a conventional arrangement in which the horse (of which only, the head 10 is shown) has a bit 12 located in its mouth 32 between its teeth (with just the end of the bit being visible, therefore). Reins (not shown) are connected to the bit 12 via bit rings 14 and extend rearwardly to be held by a rider seated on the horse's back. Typically, there is a bit ring 14 at either end of the bit 12 and the reins are joined to the bit rings 14. Traditionally, the bit 12 is held in place and prevented from falling out of the horse's mouth by a bridle 16, which generally comprises a headpiece 18, a noseband 20$a$, 20$b$, a browband 22, cheekpieces 24 and a throatlash 26. The cheekpieces 24 extend generally upwards from the bit rings 14 on either side of the horse's head 10 alongside its cheeks 28, and are connected to or integral with the headpiece 18 that extends over the top of the horse's head 10 behind its ears 30. Thus, the bit 12 cannot fall downwards and out of the horse's mouth 32 while the cheekpieces 24 and headpiece 18 are in place. To keep them in the correct position, the browband 22 extends forward across the horse's brow from the junction 34 between the headpiece 18 and the cheekpieces 24, between the eyes 36 and ears 30. This prevents the bridle 16 from slipping backwards. Likewise, the throatlash 26 extends downwardly and rearwardly from the junction 34 between the headpiece 18 and the cheekpieces 24, and passes under the horse's throat, preventing forward movement of the upper part of the bridle.

Further stabilisation is usually provided by the noseband **20*a*, 20*b*, which passes around the horse's head 10 below the eyes 36 and in the vicinity of the bit rings 14; one or more nosebands 20*a* and 20*b* may be provided and are linked back to the junction 34 between the headpiece 18 and the cheekpieces 24 by noseband attachment straps 38, usually one on either side that run substantially alongside the cheekpieces 24. Having separate cheekpieces 24 and noseband attachment straps 38 allows the bit rings 14 and cheekpieces 24 to move forward and back relative to the horse's head 10** in response to pressure exerted on the reins by the rider.

Figure 2:
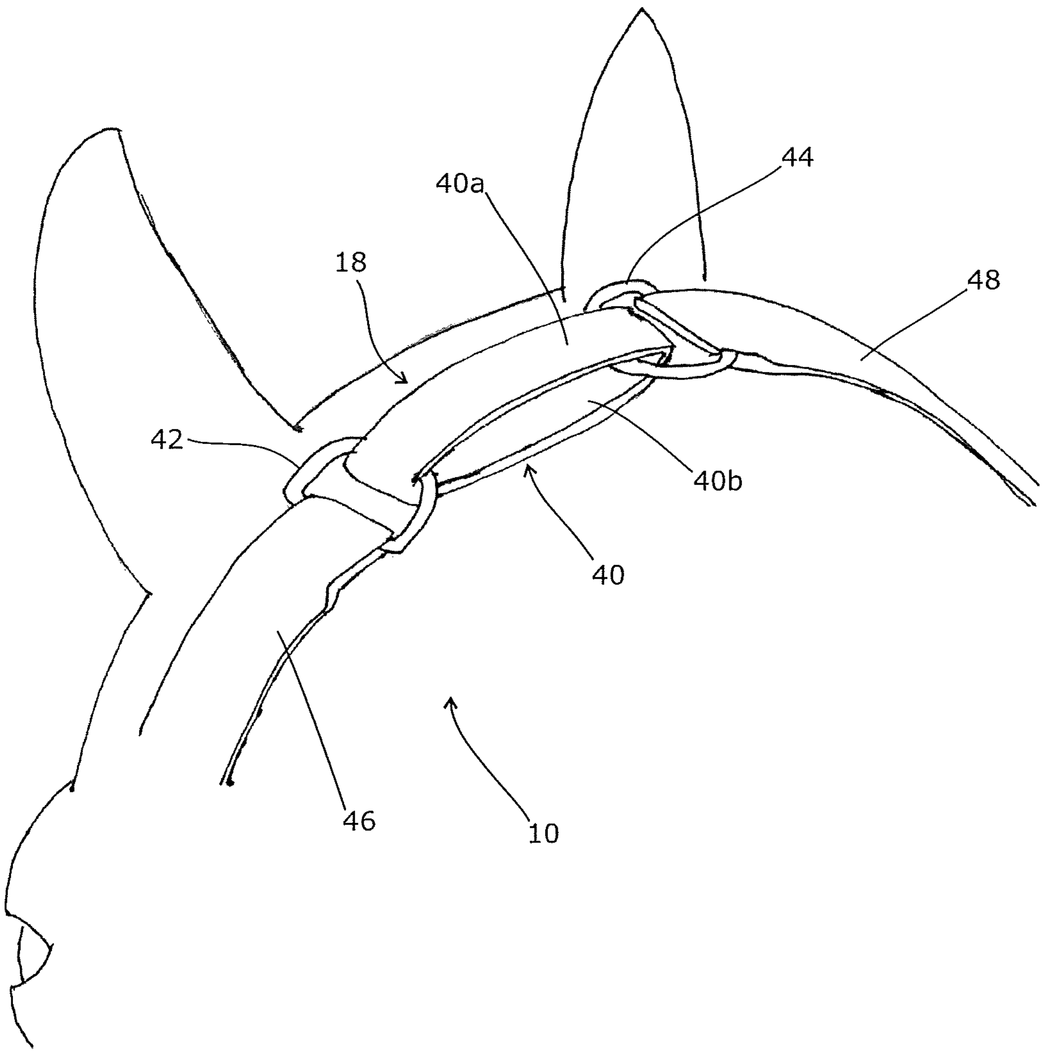
FIG. 2 shows a headpiece according to the present invention in use on a horse's head, but without the other parts of a bridle shown to aid clarity.

FIG. 2 shows a headpiece according to the present invention, which may be used with a bridle substantially as described above or as shown in FIG. 1. The headpiece 18 is formed of an elongate looped central piece 40 having an upper loop portion **40*a* and lower loop portion 40*b*. The central piece 40 encompasses curved portions of two D-rings 42, 44, with a first D-ring 42 at a first end of the central piece 40 and a second D-ring 44 at a second end of the central piece 40. The D-rings 42, 44 are in turn connected to respective side pieces 46, 48: the first D-ring 42 is connected to a first side piece 46 and the second D-ring 44 is connected to a second side piece 48. The connections between the side pieces 46, 48 and the respective D-rings 42, 44 are made by a loop formed in each side piece which engages with a straight portion of each D-ring 42, 44. The side pieces 46, 48 may be connected to, extend into, or form part of the cheekpieces, throatlash and/or noseband. The lower portion 40*b* of the central piece 40 lies substantially flat on the horse's head 10**, in use.

Figure 3:
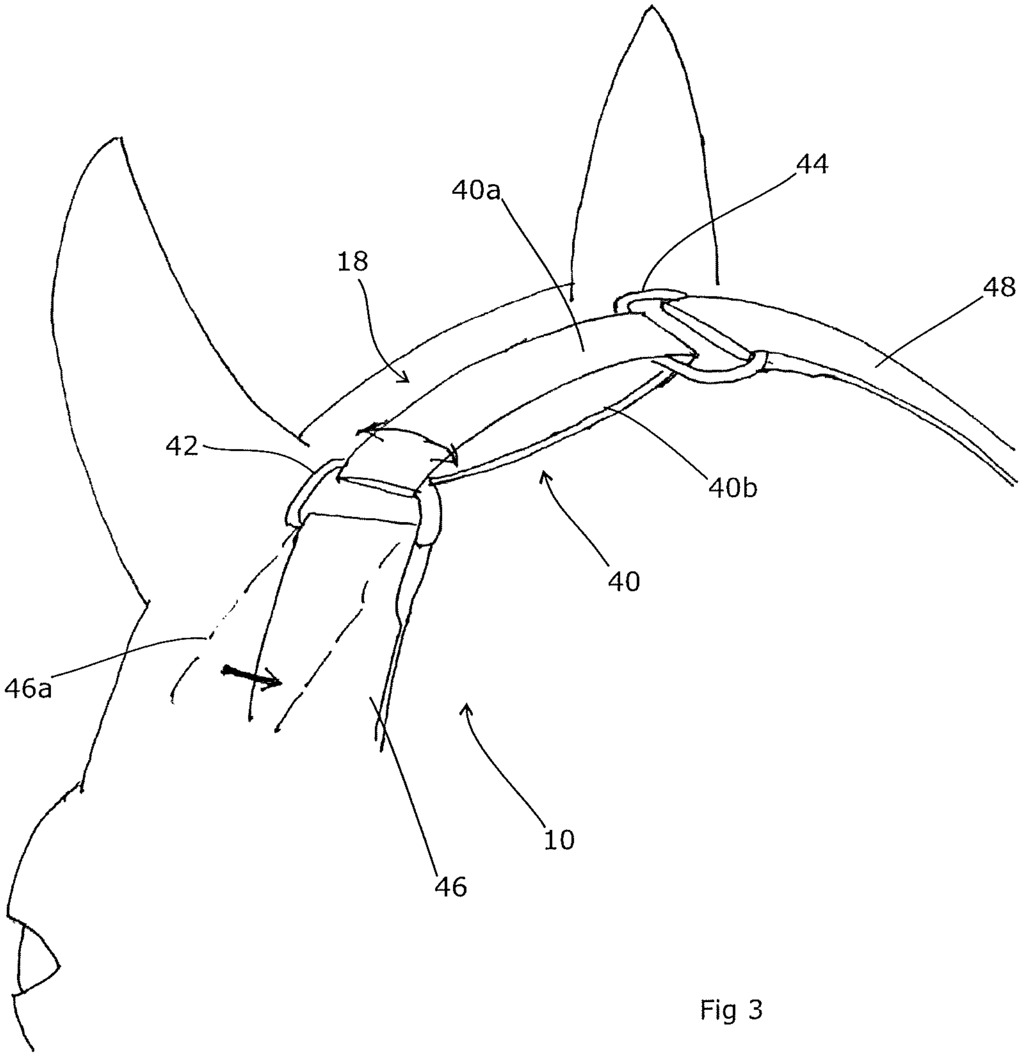
FIG. 3 shows the headpiece of FIG. 2 in use, with a side piece in a different position.

FIG. 3 shows the headpiece of FIG. 2, in a position where the first side piece 46 has been moved from its position shown in FIG. 2, shown as dashed lines **46*a* in FIG. 3. The change of position of the first side piece 46 is reflected in a rotation of the D-ring 42 with respect to the central piece 40, in that the straight portion of the D-ring 42 has not moved relative to the first side piece 46 but instead the curved portion of the D-ring 42 has been caused to slip within the looped central piece 40, so that the central piece 40 has not moved. Thus, while the first side piece 46 has been moved, the rest of the headpiece 18 has not moved: the central piece 40 remains in the same position in respect of the horse's head 10, as does the second side piece 48. The movement of the first side piece 46 thus has not transmitted tension to the second side piece 48 and, in turn, to an end of a bit (not shown) which may in turn be connected via components of the bridle (not shown) to the second side piece 48. The lower portion 40*b* of the central piece 40 remains lying substantially flat on the horse's head 10**.

Figure 4:
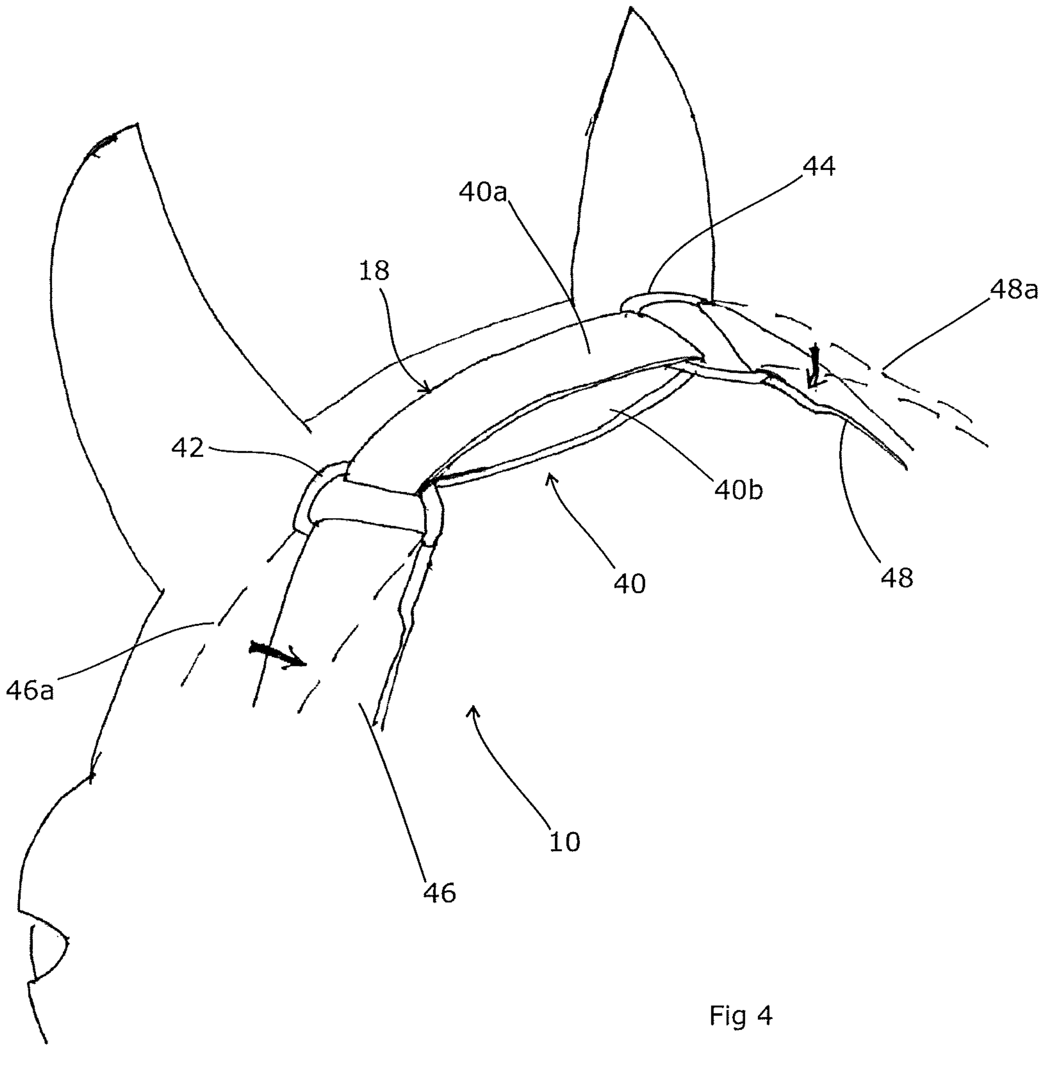
FIG. 4 shows the headpiece of FIG. 2 in use, with both side pieces in a different position.

FIG. 4 shows the headpiece of FIG. 2, with the first side piece 46 in the same position as shown in FIG. 3. In FIG. 4, the second side piece 48 has been moved from its position shown in FIGS. 2 and 3, shown as dashed lines **48*a* in FIG. 4. The change of position of the second side piece 48 is reflected in a rotation of the D-ring 44 with respect to the central piece 40, in that the straight portion of the D-ring 44 has not moved relative to the second side piece 48 but instead the curved portion of the D-ring 44 been caused to slip within the looped central piece 40, so that the central piece 40 has not moved. Thus, while the second side piece 48 has been moved, the rest of the headpiece 18 has not moved from its position shown in FIG. 3: the central piece 40 remains in the same position in respect of the horse's head 10, as does the first side piece 46. The movement of the second side piece 48 thus has not transmitted tension to the first side piece 46 and, in turn, to and end of a bit (not shown) which may in turn be connected via components of the bridle (not shown) to the first side piece 46. The lower portion 40*b* of the central piece 40 remains lying substantially flat on the horse's head 10**.

Figure 5:
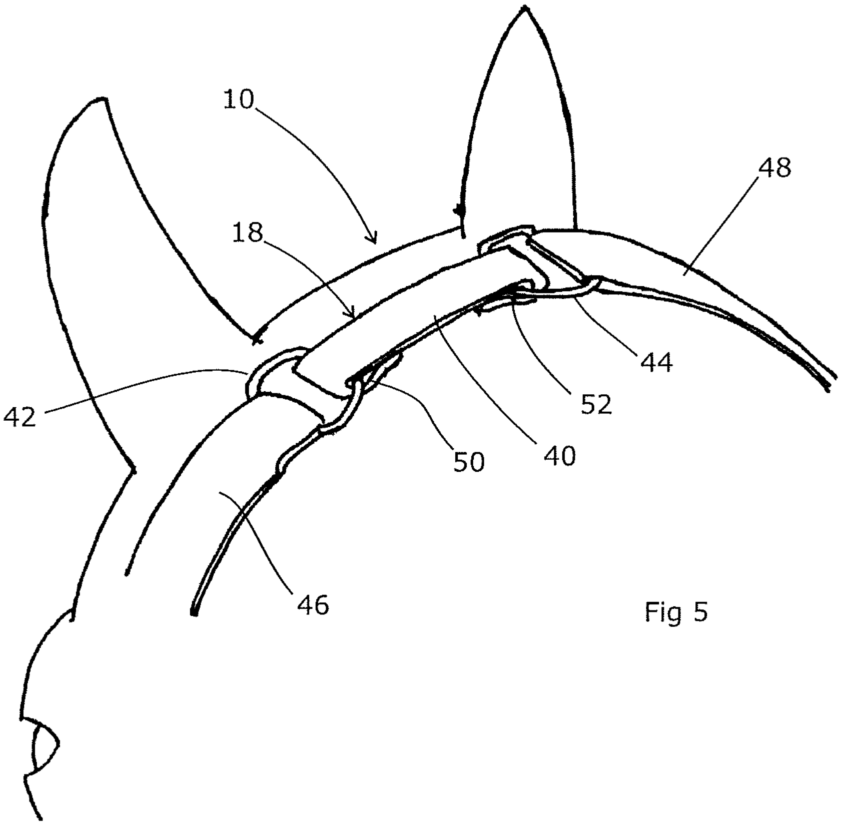
FIG. 5 shows an alternative arrangement of a headpiece according to the present invention in use on a horse's head, but without the other parts of a bridle shown to aid clarity.

FIG. 5 shows a headpiece according to the present invention, which may be used with a bridle substantially as described above or as shown in FIG. 1. The headpiece 18 is formed of an elongate central piece 40. The central piece 40 has been folded back on itself and stitched at either end to form loops 50, 52 which encompass curved portions of two D-rings 42, 44, with a first D-ring 42 at a first end of the central piece 40 and a second D-ring 44 at a second end of the central piece 40. The D-rings 42, 44 are in turn connected to respective side pieces 46, 48: the first D-ring 42 is connected to a first side piece 46 and the second D-ring 44 is connected to a second side piece 48. The connections between the side pieces 46, 48 and the respective D-rings 42, 44 are made by a loop formed in each side piece which engages with a straight portion of each D-ring 42, 44. The side pieces 46, 48 may be connected to, extend into, or form part of the cheekpieces, throatlash and/or noseband. The central piece 40 lies substantially flat on the horse's head 10, in use.

Figure 6:
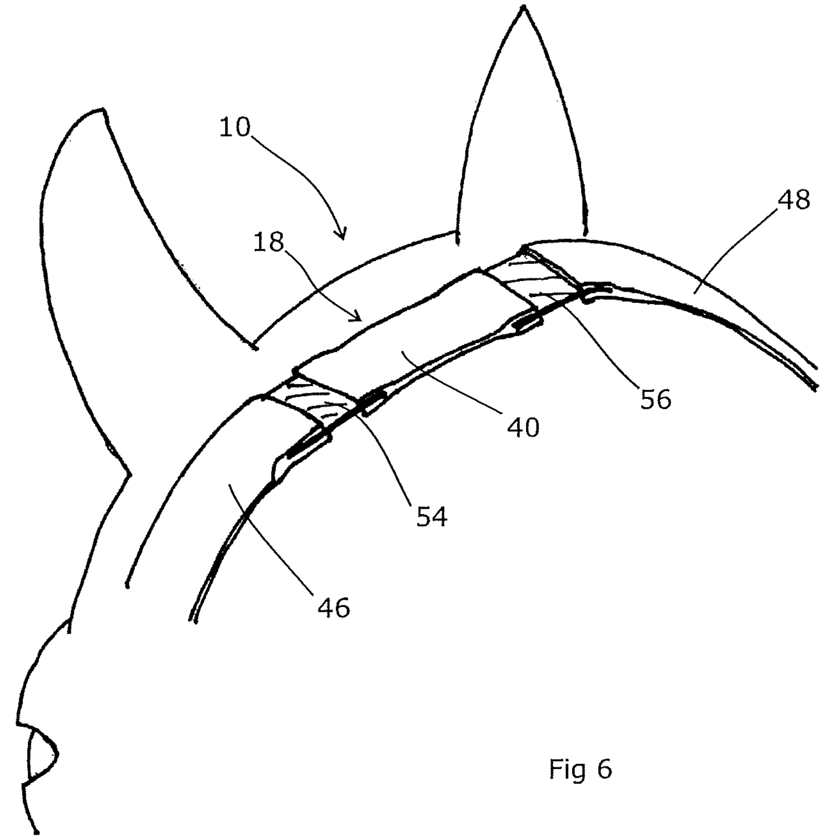
FIG. 6 shows a further alternative arrangement of a headpiece according to the present invention in use on a horse's head, but without the other parts of a bridle shown to aid clarity.

FIG. 6 shows a headpiece according to the present invention, which may be used with a bridle substantially as described above or as shown in FIG. 1. The headpiece 18 is formed of an elongate central piece 40. The central piece 40 has joined to each end an elastic piece 54, 56 which is in turn joined to respective side pieces 46, 48. The side pieces 46, 48 may be connected to, extend into, or form part of the cheekpieces, throatlash and/or noseband. The central piece 40 lies substantially flat on the horse's head 10, in use.

It will of course be understood that many variations may be made to the above-described embodiment without departing from the scope of the present invention.

The invention claimed is:

1. A bridle comprising:

a headpiece; and a browband;

the headpiece having a first side piece and a second side piece which are each configured for connection to the browband and which each include a strap extending downwardly to form a cheekpiece directly connectable to a ring, wherein the first and second side pieces are connected by an articulated linkage therebetween, and wherein the articulated linkage comprises:

a first articulated joint between the first side piece and a central piece wherein an end of the first side piece is wrapped around a first portion of a first connecting element and a first end of the central piece is wrapped around a second portion of the first connecting element, and a second articulated joint between the second side piece and the central piece wherein an end of the second side piece is wrapped around a first portion of a second connecting element and a second end of the central piece is wrapped around a second portion of the second connecting element, and wherein the first connecting element and second connecting element each comprises an arcuate length, allowing for a degree of freedom of movement of the first side piece and second piece about a connection between each of the first side piece and second side piece and the articulated linkage, and wherein when in use the articulated linkage is above a connection point between the headpiece and said browband.

2. The bridle headpiece according to claim 1, wherein the first side piece has a degree of movement allowed at the first articulated joint and the second side piece has a degree of movement allowed at the second articulated joint.

3. The bridle headpiece according to claim 1, wherein one or more of the first or second connecting elements comprises at least one ring.

4. The bridle headpiece according claim 1, wherein at least one of the first or second connecting elements comprise one or more rings and where the one or more rings are connected to a respective side piece and/or the central piece by way of a loop or loops formed in said respective side piece and/or central piece.

5. The bridle headpiece according to claim 1, wherein one or more of the articulated joints comprises a D-ring.

6. The bridle headpiece according to claim 1, wherein a portion of the central piece is formed of a flexible resilient material.

7. The bridle headpiece according to claim 6, wherein the flexible resilient material is selected from leather, deer-skin, knitted material, woven material, suitable synthetic material.

8. The bridle headpiece according to claim 1, further comprising a bit, and wherein the ring comprises a first bit ring and a second bit ring, each on opposing ends of the bit, the first bit ring links the bit to the first side piece, and the second bit ring links the bit to the second side piece.

9. A bridlery item comprising a headpiece, the headpiece configured for connecting to a browband, the headpiece having a first side piece and a second side piece which are each configured for connection to the browband and where each include a strap extending downwardly to form a cheekpiece directly connectable to a ring, wherein the first and second side pieces are connected by an articulated linkage therebetween, wherein the articulated linkage comprises a first articulated joint between the first side piece and a central piece wherein an end of the first side piece is wrapped around a first portion of a first connecting element and a first end of the central piece is wrapped around a second portion of the first connecting element, and a second articulated joint between the second side piece and the central piece wherein an end of the second side piece is wrapped around a first portion of a second connecting element and a second end of the central piece is wrapped around a second portion of the second connecting element, wherein each of the first and second connecting elements comprises an arcuate length and the articulated linkage allowing for a degree of freedom of movement of the first side piece and second piece about a connection between each of the first side piece and second side piece and the articulated linkage, and wherein when the headpiece is used with a browband the articulated linkage is above a connection point between the headpiece and said browband.

10. The bridlery item according to claim 8, wherein the first side piece has a degree of movement allowed at the first articulated joint and the second side piece has a degree of movement allowed at the second articulated joint.

11. The bridlery item according to claim 10, having a sequence of: the first side piece, the first articulated linkage, the central piece, the second articulated linkage, and then the second side piece, the bridlery item further configured for connecting to the browband below the articulated linkages, in use.

12. The bridle item according to claim 10, further comprising a bit, and wherein the ring comprises a first bit ring and a second bit ring, each on opposing ends of the bit, the first bit ring links the bit to the first side piece, and the second bit ring links the bit to the second side piece.

* * * * *